Aug. 22, 1967

D. J. SMITH 3,337,681

SPLICE CASE

Filed Oct. 19, 1964

INVENTOR.
Donald J. Smith
BY
TW Secrest
ATTORNEY

Aug. 22, 1967          D. J. SMITH                3,337,681
                       SPLICE CASE
Filed Oct. 19, 1964
                                                2 Sheets-Sheet 2

INVENTOR.
Donald J. Smith
BY
TWSecrest

ATTORNEY

United States Patent Office 3,337,681
Patented Aug. 22, 1967

3,337,681
SPLICE CASE
Donald J. Smith, Seattle, Wash.
(4041 90th Ave. SE., Mercer Island, Wash. 98040)
Filed Oct. 19, 1964, Ser. No. 404,757
13 Claims. (Cl. 174—92)

This invention relates to a splice case for protecting spliced cable.

In the laying of electrical cable having numerous individual electrical conductors it is sometimes necessary to splice the cable. In order to protect the spliced cable I have invented this splice case. Accordingly, an object of this invention is the provision of a cover for protecting spliced cable; such a cover having a minimum of parts; a cover which is inexpensive to manufacture; a cover which can be readily assembled; a cover requiring substantially no maintenance; and, a cover having an integral protective covering and sealant.

These and other important objects and advantages will be more clearly brought forth upon reference to the accompanying drawings, a detailed description of the invention and attendant claims.

Figure 3:
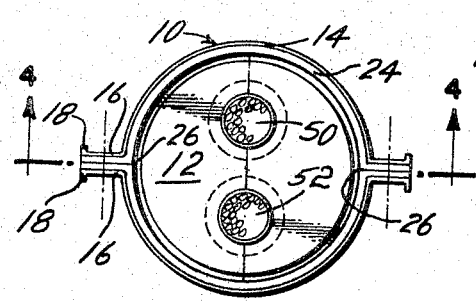
FIG. 3 is an end view of the splice case showing the tubular member, the end seal and two electrical cables in the end seal.
Figure 4:
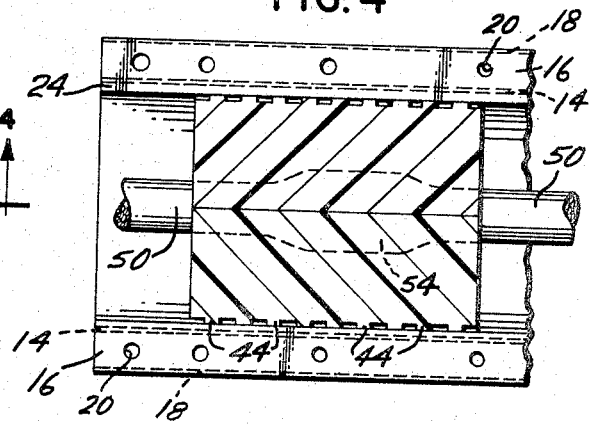
Figure 5:
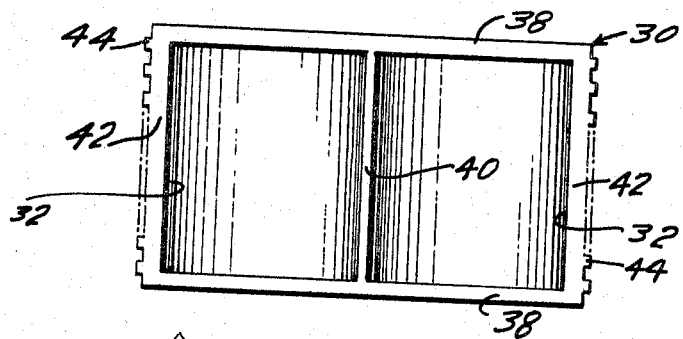
Figure 6:
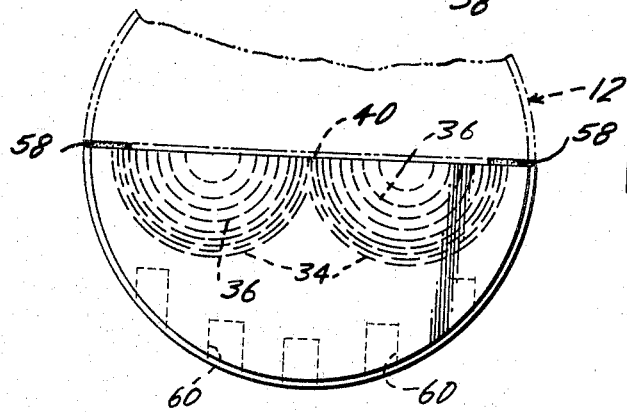
Figure 7:
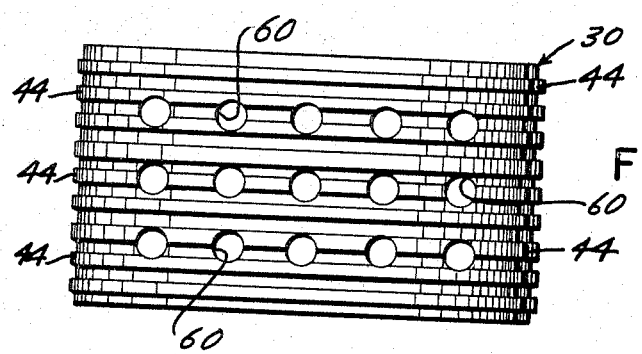
Figure 8:
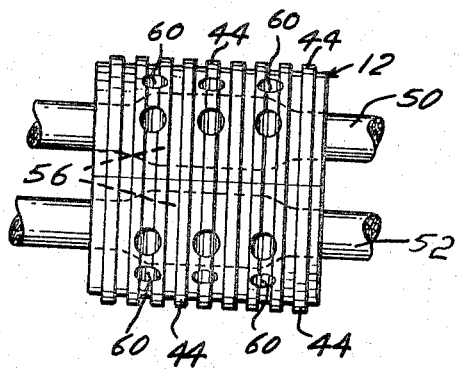

FIG. 4, on an enlarged scale, taken on line 4—4 of FIG. 3, is a cross-sectional view illustrating a half longitudinal member, an end seal, and in phantom an electrical cable which has tape or the like wrapped around it to fit in the end seal;

FIG. 5 is a view looking at the interior of an end seal and shows two-cylindrical longitudinal cavities, side walls, end wall and circumferential peripheral ridges;

FIG. 6 is a fragmentary view looking at the end of an end seal, and shows one-half of the end seal in solid line and indicia for indicating where the end seal should be cut to receive an electrical cable, and fragmentarily shows the other half of the end seal;

FIG. 7 is a view, taken on line 7—7 of FIG. 6, and illustrates the circumferential peripheral ridges on the end seal; and FIG. 8 is a side view of an end seal and shows two cables in the end seal and which cables have been wrapped to increase their size to fit in the semi-cylindrical longitudinal cavities.

In the drawings it is seen that the splice case comprises a tubular member 10 and two end seals 12.

The tubular member 10 actually is composed of two half tubular members 14 having in a lateral cross-sectional view a configuration of a semi-circular member. On the free ends of the semi-circular member 14 there is a flange 16 which bends back on the member 14 to form a lip 18.

Figure 1:
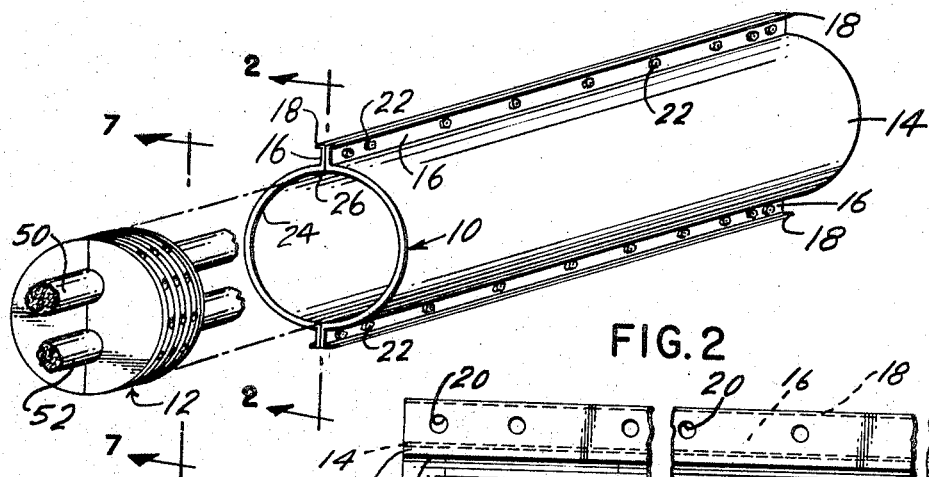
FIGURE 1 is an exploded perspective view showing a tubular member, an end seal, and electrical cable running through the end seal.

In the flanges 16 there are holes 20. To assemble the two half tubular members 14 into the tubular member 10 a nut and bolt combination 22 are positioned in the openings 20 of two adjacent flanges 16. As is seen, in FIGURES 1 and 3, there results the tubular member 10.

On the inside surface of the half tubular member 14 and also the flange 16 there is a flexible or yieldable material 24. The material 24 is bonded to the longitudinal member 14. From experience I have found that a soft inert plastic, such as neoprene, is satisfactory for the material 24. In addition, other plastics may be used, such as polyethylene or polypropylene or even lead. The material 24 should be bonded to 14 and 16.

The half tubular member 14, 16 and 18 is preferably made of a resistant metal, such as stainless steel. In actual usage I have found stainless steel to be desirable.

One particular model has a half longitudinal tubular member of a length of about seventeen and seven-eighths inches (17⅞") and the stainless steel of a thickness of approximately 0.040 to 0.045 inch. The stainless steel may be 302 stainless steel. The flange 16 may have a width of nine-sixteenths of an inch (9/16") inside and the lip may be approximately one-eighth of an inch (⅛") in length. The holes 20 may be one-fourth (¼") holes. The yieldable material 24 may have a thickness of approximately three-thirty-seconds (3/32") to one-eighth of an inch (⅛"). I have found that the yieldable material 24 should have a square corner 26 at the junction of that portion of the yieldable material next to 14 and that portion of the yieldable material next to the flange 16.

The end seal 12 comprises two mating half tubular members 30, see FIGURES 5 and 6. In FIGURE 5 the observer is looking at the interior of the half tubular member 30. In FIGURE 6 the observer is looking at the end of a half tubular member 30, see the drawing in solid line. From FIGURES 5 and 6 it is seen that the member 30 is, in lateral cross-sectional view, of a semi-circular cylindrical configuration.

In FIGURE 5 it is seen that the member 30 is hollow and comprises two longitudinal cavities 32 in a lateral cross-sectional view of a semi-circular configuration. Actually, in FIGURE 6 there is illustrated by phantom lines 34 the semi-circular appearance of these cavities. In FIGURE 6 it is seen that there are numerous concentric phantom lines 36. The specifically identified line 34 indicates the dimension of the two cavities 32 in the member 30. The other lines 36 are indicia to assist a repairman in the cutting of end walls 38 for receiving an electrical cable. At the junction of the two cavities 32 there is indicated a wall 40.

In FIGURE 5 it is seen that the semi-cylindrical longitudinal cavities 32 define an end wall 38 and side walls 42 in the half tubular member 30. On the half tubular member 30 there are a number of circumferential peripheral ridges 44.

The member 30 may be made of plastic such as polyethylene, or polypropylene or another suitable plastic. I have made the member 30 from black polyethylene. The length of the member 30 or the side 42 is approximately one and eleven-sixteenths inches (1 11/16") and the thickness of the wall 42 at its narrowest place is approximately 0.150". The radius of the member 30 at the end wall 38 is approximately one and seven-eighths inches (1⅞") and the thickness of the end wall 38 is approximately three-thirty-seconds of an inch (3/32"). The thickness of a ridge 44 is approximately 0.025 inch, and the radius of the cavity 32 is approximately 0.925 inch. These are the dimensions for a particular member 30.

It is to be realized that the dimensions of the tubular member 10 and the end seal 12 may vary to accommodate the particular electrical cable to be protected.

Figure 2:
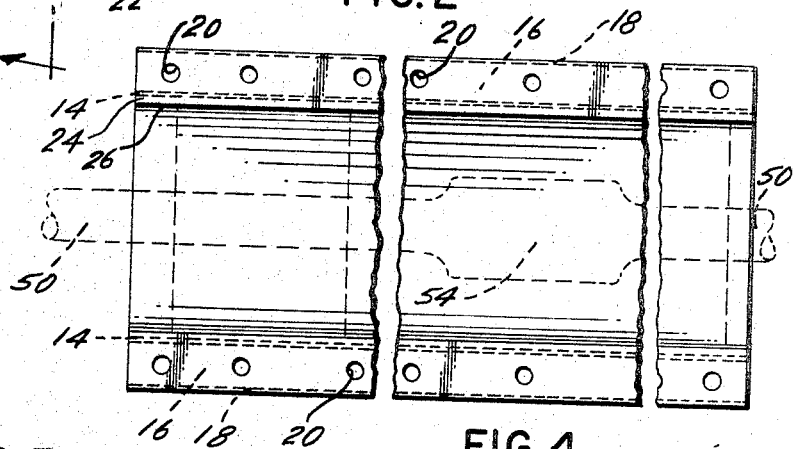
FIG. 2 is a fragmentary side elevational view of the splice case and shows a cable entering the splice case, the end seals in phantom, and that portion of the cable which has been spliced.

For the purpose of illustration assume that two electrical cables 50 and 52 are to be spliced. After the splicing has been completed, see FIGURE 2, wherein the splicing is indicated at 54, the spliced cables are in a condition to be protected. The end seal 12 is then placed around the two cables 50 and 52. The repairman may estimate the size of the cables 50 and 52 and by means of his pocket knife cut along the appropriate indicia 36 in the end wall 38. Then, a tape 56 may be wrapped around the cables 50 and 52. The purpose of the tape 56 is to enlarge the size of the cables 50 and 52 so they fit snugly in the cavities 32 in the end seal 12. Then, some plastic tape or a mastic 58 may be placed along the side walls 42 and the end walls 38 and the two members 30 pressed together to fit snugly around the electrical cables 50 and 52 and the tape 56. It is to be realized that there are two end seals 12. One on each side of the splice 54. Both of these end seals will fit inside of the tubular member 10.

The half longitudinal tubular members are now ready to be positioned around the two end seals 12, the cables 50 and 52 between these two end seals and the splice 54. The two half longitudinal tubular members are brought together so that the flanges 16 of the two members are adjacent to each other and with the holes 20 in alignment. Then, the nuts and bolts 22 may be arranged in these holes 20 and tightened so as to draw the two half longitudinal tubular members together. The yieldable material 24 of the two half tubular members contact each other so as to form a fluid tight seal. Also, the ridges 44 of the end seal 12 become embedded in the yieldable material 24 so as to form a fluid tight seal and mechanically secure the end seals in position.

It is seen that the yieldable material 24 functions as a gasket and that it is not necessary to have a separate mastic or a separate cape to form a fluid tight joint between the two half tubular members or between the tubular member 10 and the end seal 12. Of assistance in forming a fluid tight joint between the two half longitudinal members and also the tubular member 10 and the end seal 12 is the fact that there is a square corner 26.

Normally, in the electrical cables 50 and 52 there is a positive internal pressure of approximately 10 pounds per square inch gauge. This is to insure that no fluid will enter in the cable 50 or the cable 52. With this positive pressure inside the cable there will be a positive pressure inside of the splice case comprising the tubular member 10 and the end seal 12.

From FIGURES 6, 7 and 8 it is seen that the member 30 has a number of circular indentations 60. These indentations 60 serve two purposes. One is that in the molding of the members 30 there is a large volume of plastic. In order to prevent the plastic from curing away and shrinking away from the mold and possibly cracking, there are pins in the mold. These pins leave the indentations 60 which decrease the actual volume of plastic employed. The indentations 60 also serve the purpose of acting as additional gripping means for the material 24. As is recalled, the material 24 is a yieldable material and may be of neoprene rubber or lead or other suitable material. The material 24 will flow, to a degree, into the indentations 60 so as to more firmly position the member 12 with the member 10.

From the foregoing it is seen that I have presented a splice case which has few parts and yet offers protection to spliced cable. In fact, the splice case may be buried in the ground and due to the stainless steel outer shell there is little corrosion, if any corrosion, of the protective outer shell. The inner material, such as the yieldable material 24, be it of neoprene or lead or suitable plastic, is not subject to corrosion or erosion. Also, the end seal 12, be it of polyethylene or polypropylene or other suitable plastic, is not subject to corrosion or erosion. Further, it is seen that it is relatively simple and takes very little time to assemble the splice case to protect spliced cable. Further, it is seen that there are fluid tight joints between the two half longitudinal tubular members of the splice case and also between the two mating half tubular members of the end seal. As a result there is very little possibility of fluid entering into the splice case and damaging the splice 54 of the electrical cable.

Also, a workman may readily disassemble the splice case by unscrewing the nut and bolt combinations of the tubular member 10 and taking apart the two half tubular members. Then, the workman may examine the splice 54 or may do what other examination he considers to be necessary. Further, if necessary, the end seal 12 may be disassembled.

In addition, the tubular member 10 and the end seals 12 accommodate all reasonable sizes of communication cable. If necessary, for extremely large sizes of communication cable, the members 10 and 12 may be made in larger sizes. But for standard communication cable the members 10 and 12 accommodate all suitable sizes. In certain instances there is employed a communication cable having an inner sheath, a metallic coating around the inner sheath or a metallic tube around the inner sheath and then an outer sheath around the metallic tube. The end seal 12 may be cut along the appropriate indicia 36 to accommodate the outer sheath. The outer sheath and the metallic tube may be removed so as to expose the inner sheath. Then another end seal 12 may be cut along the indicia 36 to accommodate the inner sheath 12. In other words, instead of two end seals 12, one at each end of the tubular member 10, there are four end seals 12 with two of the end seals being at each end of the tube 10. In another instance when it is not possible to splice or repair the cable at one location there may be employed two splice cases next to each other or separated by a few inches. In this instance these two splice cases will supply protection for the cable.

From this it is seen that it is possible to readily disassemble the splice case for examination of the electrical cable or cables therein.

Having presented my invention, what I claim is:

1. A protective cover for a cable splice, said cover comprising:
    (a) a cylindrical case comprising two semi-circular inert members;
    (b) each member having a flange on each side;
    (c) means to unite adjacent flanges of the two members;
    (d) the protective cover having on its inner surface including the flanges a soft inert plastic;
    (e) end seals;
    (f) said end seals being inside of the cylindrical case;
    (g) each end seal being composed of two mating semi-circular members;
    (h) each end seal having external circumferential ridges;
    (i) each member of each end seal having two semi-circular longitudinal cavities;
    (j) each end seal having end walls;
    (k) two of said members in mating relation defining two enclosed cylindrical longitudinal cavities;
    (l) said end seals having an external diameter larger than the internal diameter of the soft inert plastic so that the circumferential ridges embed themselves in the soft inert plastic; and
    (m) a cable passing through the end walls and the end seals and into the cylindrical case.

2. A protective cover for a cable splice, said cover comprising:
    (a) a cylindrical case comprising two semi-circular members;
    (b) means to unite the two semi-circular members into an integral case;
    (c) the protective cover having on its inner surface a soft inert plastic;
    (d) end seals;
    (e) said end seals being inside of the cylindrical case;
    (f) each end seal being composed of two mating semi-circular members;

(g) each end seal having external circumferential ridges;
(h) each member of each end seal having a semi-circular longitudinal cavity;
(i) each end seal having end walls;
(j) two of said members in mating relation defining two enclosed cylindrical longitudinal cavities;
(k) said end seals having an external diameter larger than the internal diameter of the soft inert plastic so that the circumferential ridges embed themselves in the soft inert plastic; and
(l) a cable passing through the end walls and the end seals and into the cylindrical case.

3. A protective cover for a cable splice, said cover comprising:
(a) a tubular member comprising two longitudinal half tubular members;
(b) means to unite the two half longitudinal tubular members into said tubular member;
(c) end seals;
(d) said end seals being inside of the tubular member;
(e) each end seal being composed of two mating half tubular members;
(f) each end seal having end walls;
(g) said two mating half tubular members of each end seal in mating relation defining an enclosed cavity;
(h) said tubular member comprising two longitudinal half tubular members having on its inner surface a yieldable member; and
(i) said end seals having an external configuration corresponding to the internal configuration of the yieldable material and the tubular member and a lateral cross-sectional area larger than the lateral cross-sectional area of the yieldable material so that the end seals embed themselves in the yieldable material upon the forming of the tubular member from the two half longitudinal tubular members.

4. An end seal, said end seal comprising:
(a) two mating semi-circular members;
(b) each semi-circular member having two semi-circular longitudinal cavities;
(c) said end seal having end walls on the ends of said semi-circular longitudinal cavities;
(d) two of said semi-circular members in mating relation defining two enclosed cylindrical longitudinal cavities; and,
(e) each end seal having external circumferential ridges.

5. A protective cover and a cable splice, said cover comprising:
(a) a cylindrical case comprising two semi-circular inert members;
(b) each member having a flange on each side;
(c) means to unite adjacent flanges to the two members;
(d) the protective cover having on its inner surface including the flanges a soft inert plastic;
(e) end seals;
(f) said end seals being inside of the cylindrical case;
(g) each end seal being composed of two mating semi-circular members;
(h) each end seal having external circumferential ridges;
(i) each member of each end seal having two semi-circular longitudinal cavities;
(j) each end seal having end walls;
(k) two of said members in mating relation defining two enclosed cylindrical longitudinal cavities;
(l) said end seals having an external diameter larger than the internal diameter of the soft inert plastic so that the circumferential ridges embed themselves in the soft inert plastic;
(m) a cable passing through the end walls and the end seals and into the cylindrical case and said cable comprising a cable splice inside said cylindrical case; and,
(n) said soft inert plastic being bonded to said semi-circular inert members.

6. A protective cover and a cable splice, said cover comprising:
(a) a cylindrical case comprising two semi-circular inert members;
(b) each member having a flange on each side;
(c) means to unite adjacent flanges of the two members;
(d) the protective cover having on its inner surface including the flanges a soft inert plastic;
(e) end seals;
(f) said end seals being inside of the cylindrical case;
(g) each end seal being composed of two mating semi-circular members;
(h) each end seal having external circumferential ridges;
(i) each member of each end seal having two semi-circular longitudinal cavities;
(j) each end seal having end walls;
(k) two of said members in mating relation defining two enclosed cylindrical longitudinal cavities;
(l) said end seals having an external diameter larger than the internal diameter of the soft inert plastic so that the circumferential ridges embed themselves in the soft inert plastic;
(m) a cable passing through the end walls and the end seals and into the cylindrical case and said cable comprising a cable splice inside said cylindrical case;
(n) said soft inert plastic being bonded to said semi-circular inert members; and,
(o) said soft inert plastic being neoprene.

7. A protective cover and a cable splice, said cover comprising:
(a) a cylindrical case comprising two semi-circular members;
(b) means to unite the two semi-circular members into an integral case;
(c) the protective cover having on its inner surface a soft inert plastic;
(d) end seals;
(e) said end seals being inside of the cylindrical case;
(f) each end seal being composed of two mating semi-circular members;
(g) each end seal having external circumferential ridges;
(h) each member of each end seal having a semi-circular longitudinal cavity;
(i) each end seal having end walls;
(j) two of said members in mating relation defining two enclosed cylindrical longitudinal cavities;
(k) said end seals having an external diameter larger than the internal diameter of the soft inert plastic so that the circumferential ridges embed themselves in the soft inert plastic;
(l) a cable passing through the end walls and the end seals and into the cylindrical case and said cable comprising a cable splice inside said cylindrical case; and,
(m) said soft inert plastic being bonded to said semi-circular inert members.

8. A protective cover and a cable splice, said cover comprising:
(a) a cylindrical case comprising two semi-circular members;
(b) means to unite the two semi-circular members into an integral case;
(c) the protective cover having on its inner surface a soft inert plastic;
(d) end seals;
(e) said end seals being inside of the cylindrical case;
(f) each end seal being composed of two mating semi-circular members;

(g) each end seal having external circumferential ridges;
(h) each member of each end seal having a semi-circular longitudinal cavity;
(i) each end seal having end walls;
(j) two of said members in mating relation defining two enclosed cylindrical longitudinal cavities;
(k) said end seals having an external diameter larger than the internal diameter of the soft inert plastic so that the circumferential ridges embed themselves in the soft inert plastic;
(l) a cable passing through the end walls and the end seals and into the cylindrical case and said cable comprising a cable splice inside said cylindrical case;
(m) said soft inert plastic being bonded to said semi-circular members; and,
(n) said soft inert plastic being neoprene.

9. A protective cover for a cable splice, said cover comprising:
(a) a tubular member comprising two longitudinal half tubular members;
(b) means to unite the two half longitudinal tubular members into said tubular member;
(c) end seals;
(d) said end seals being inside of the tubular member;
(e) each end seal being composed of two mating half tubular members;
(f) each end seal having end walls;
(g) said two mating half tubular members of each end seal in mating relation defining an enclosed cavity;
(h) said tubular member comprising two longitudinal half tubular members having on the inner surface a yieldable material;
(i) said end seals having an external configuration corresponding to the internal configuration of the yieldable material and the tubular member and a lateral cross-sectional area larger than the lateral cross-sectional area of the yieldable material so that the end seals embed themselves in the yieldable material upon the forming of the tubular member from the two half longitudinal tubular members; and,
(j) said yieldable material being bonded to said half tubular members.

10. A protective cover for a cable splice, said cover comprising:
(a) a tubular member comprising two longitudinal half tubular members;
(b) means to unite the two half longitudinal tubular members into said tubular member;
(c) end seals;
(d) said end seals being inside of the tubular member;
(e) each end seal being composed of two mating half tubular members;
(f) each end seal having end walls;
(g) said two mating half tubular members of each end seal in mating relation defining an enclosed cavity;
(h) said tubular member comprising two longitudinal half tubular members having on the inner surface a yieldable material;
(i) said end seals having an external configuration corresponding to the internal configuration of the yieldable material and the tubular member and a lateral cross-sectional area larger than the lateral cross-sectional area of the yieldable material so that the end seals embedded themselves in the yieldable material upon the forming of the tubular member from the two half longitudinal tubular members;
(j) said yieldable material; being bonded to said half tubular members; and,
(k) said yieldable material being neoprene.

11. A protective cover for a cable splice, said cover comprising:
(a) a tubular member comprising two longitudinal half-tubular members;
(b) means to unite the two half longitudinal tubular members into said tubular member;
(c) end seals;
(d) said end seals being inside of the tubular member;
(e) each end seal being composed of two mating half tubular members;
(f) said two mating half tubular members of each end seal in mating relation defining an enclosed cavity;
(g) said end seal having an external configuration corresponding to the internal configuration of the tubular member;
(h) said end seal having a lateral cross-sectional area less than the lateral cross-sectional area of the tubular member;
(i) a yieldable material between the end seal and the tubular member; and,
(j) said end seal having a lateral cross-sectional area greater than the internal lateral cross-sectional area of the yieldable material.

12. A protective cover for a cable splice, said cover comprising:
(a) a tubular member comprising two longitudinal half tubular members;
(b) means to unite the two half longitudinal tubular members into said tubular member;
(c) end seals;
(d) said end seals being inside of the tubular member;
(e) each end seal being composed of two mating half tubular members;
(f) said two mating half tubular members of each end seal in mating relation defining an enclosed cavity;
(g) said end seal having an external configuration corresponding to the internal configuration of the tubular member;
(h) said end seal having a lateral cross-sectional area less than the lateral cross-sectional area of the tubular member;
(i) a yieldable material between the end seal and the tubular member;
(j) said end seal having a lateral cross-sectional area greater than the internal lateral cross-sectional area of the yieldable material; and,
(k) said yieldable material being bonded to the tubular member.

13. A protective cover for a cable splice, said cover comprising:
(a) a tubular member comprising two longitudinal half tubular members;
(b) means to unite the two half longitudinal tubular members into said tubular member;
(c) end seals;
(d) said end seals being inside of the tubular member;
(e) each end seal being composed of two mating half tubular members;
(f) said two mating half tubular members of each end seal in mating relation defining an enclosed cavity;
(g) said end seal having an external configuration corresponding to the internal configuration of the tubular member;
(h) said end seal having a lateral cross-sectional area less than the lateral cross-sectional area of the tubular member;
(i) a yieldable material between the end seal and the tubular member;
(j) said end seal having a lateral cross-sectional area greater than the internal lateral cross-sectional area of the yieldable material;
(k) said yieldable material being bonded to the tubular member; and, (1) said yieldable material being neoprene.

References Cited

UNITED STATES PATENTS 2,788,385 4/1957 Doering et al. -------- 174—92
3,054,847 9/1962 Colbert ----------- 174—93 X
3,138,657 6/1964 Wengen ------------ 174—92

FOREIGN PATENTS 541,919 4/1956 Italy.

LEWIS H. MYERS, *Primary Examiner.*
D. L. CLAY, *Examiner.*